Sept. 18, 1945.  A. W. GODDARD ET AL  2,384,993
ARTIFICIAL BAIT
Filed May 15, 1944
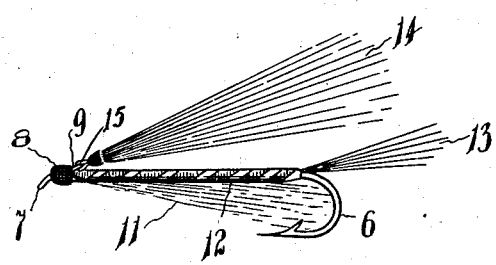
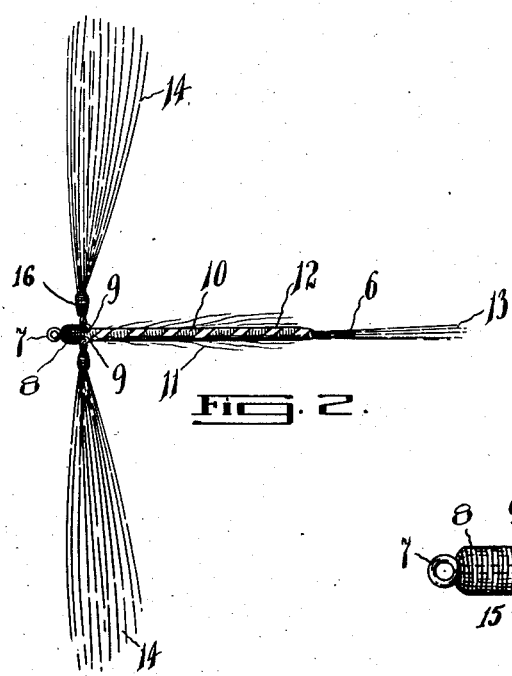
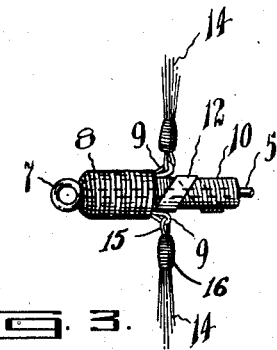
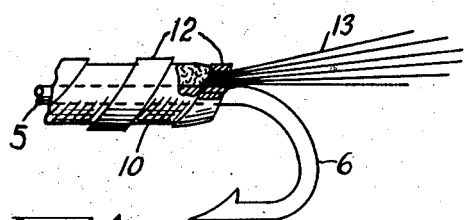
INVENTORS
A. W. GODDARD AND
A. A. HALLETT
By Frederick C. Bromley
Atty.

Patented Sept. 18, 1945

2,384,993

UNITED STATES PATENT OFFICE 2,384,993

ARTIFICIAL BAIT

Alfred W. Goddard and Albert A. Hallett, Toronto, Ontario, Canada

Application May 15, 1944, Serial No. 535,608

2 Claims. (Cl. 43—48)

The invention relates to improvements in artificial bait and has for its object the provision of a fish lure especially adapted for casting and devised to resemble a fly or similar winged insect and to have articulate wings which when a cast is made will spread and float on the water with a lifelike motion.

A further object of the invention is to produce a highly serviceable and effective casting-fly having novel characteristics of construction in which the shank portion of an ordinary hook is used to form the body of the fly by an attachment of a filamentous material lapped or otherwise applied and including the lapping of a fine metal strip which is desirably of a bright colour and in which said hook is rendered buoyant by the body structure so that its shank lies horizontally on the surface of the water with the bill downturned. The filamentary material may be of a suitable colour and may include fibres loosely extending toward the bill.

A distinctive feature of the invention is that the wings are joined to the body by a pivot or universal joint which permits them to have movement in all directions.

A further distinctive feature is that the wings are composed of hairs and/or feathers, or like substances, and of a colour, or colours, to form an attractive bait.

The selected embodiment of the invention is illustrated in the accompanying drawing, in which:

Fig. 1 is a side view of the bait with the wings folded.

Fig. 2 is a plan view thereof with the wings spread.

Fig. 3 is a detail showing more particularly the manner of connecting the wings to the body.

Fig. 4 is a fragmentary elevation view, partly in section, showing how the tail feathers are secured to the shank by the strip.

Like numerals of reference indicate corresponding parts in each of the figures throughout the drawing.

In carrying out the invention a common fishhook is used having a shank 5, a bill 6 and an eye 7. The eye is attachable as customary to the line of a casting reel secured to a rod. The portion of the shank adjoining the eye is supplied with a tightly wound lapping of fibrous material, such as a thread, suitable to provide an enlargement constituting a head 8 of a fly. This lapping serves to secure a pair of eyelets 9 to the shank at the immediate rear of said head. Said eyelets are disposed one at each side of the shank with their eye parts extending outwardly of said head, as will best be seen from an inspection of Fig. 3. The eyelets form part of the means for connecting the wings, as will be more fully explained later.

The bill 6 is downturned and the shank is covered with a body-forming material comprising a lapping of a filamentous substance 10 sufficient to cause the completed body to float. The fibrous material may include a tuft or strands disposed loosely toward the bill, as indicated at 11. The material 10 which is lapped or massed about the shank is coloured and secured in place by suitable means, which preferably consists of a lapping of a fine metal strip 12 having spaced coils and being of a different colour to that of the body-forming mass 10. From the end of the body there projects a coloured tail feather 13, which is secured to the shank by the strip 12.

The depending bill 6 stabilizes the body and maintains it on a substantially even keel when the device is resting on water.

The wings 14 are formed of a light-in-weight buoyant material such as tufts of filamentous elements in the nature of strands of hairs, or otherwise formed as by means of feathers. The wings are of a color or colors preferably of a contrast to those of the body and are attached to the body by an articulated connection which permits them to have universal movement. The connection comprises the provision of eyelets 15 on the wings secured as by a lapping of stranded material 16. The eyelet of a wing is linked with an eyelet 9 aforesaid and provides a swivel juncture which not only permits it to fold and spread but also permits it to rise and fall with surface motion of the water.

In the use of the bait the wings fold alongside of the body in making a cast, and when it comes to rest on the water the wings spread, and any slight jerk or pull on the line causes them to fold with the result that there is an animated effect which simulates a lifelike bait.

It is not intended that the invention shall be restricted to the specific construction of the wing connecting means herein disclosed as other modes of connecting the wings to the body may be resorted to as coming within the spirit and scope of the invention.

What we claim is:

1. A casting-fly bait comprising a hook having a shank with an eye at one end and a bill at the other end, a lapping of filamentary material about said shank adjacent to said eye to form the head of the fly, eyelets secured to the shank by said filamentary material, a lapping of filamentous material about the shank to compose the body of the fly, a metal strip wound around the filamentous material to secure it to the shank, tufts of a filamentous material forming wings, and eyelets secured to said wings and linked with the eyelets aforesaid to connect them to the shank.

2. A casting-fly bait comprising a hook having a shank with an eye at one end and a bill at the other end, a lapping of filamentary material about said shank adjacent to said eye to form the head of the fly, eyelets on the shank having eye parts extending laterally thereof, a lapping of filamentous material about the shank to compose the body of the fly, a metal strip wound around the filamentous material to secure it to the shank, tufts of a filamentous material forming wings, and eyelets secured to said wings and linked with the eyelets aforesaid to connect them to the shank.

ALFRED W. GODDARD.
ALBERT A. HALLETT.